(12) United States Patent
Kharbanda et al.

(10) Patent No.: US 12,346,386 B2
(45) Date of Patent: Jul. 1, 2025

(54) VISUAL AND AUDIO MULTIMODAL SEARCHING SYSTEM

(71) Applicant: Google LLC, Mountain View, CA (US)

(72) Inventors: Harshit Kharbanda, Pleasanton, CA (US); Belinda Luna Zeng, Cupertino, CA (US); Viviana Caso Corella, San Francisco, CA (US); Christopher James Kelley, Orinda, CA (US); Jessica Lee, Brooklyn, NY (US); Pendar Yousefi, Sunnyvale, CA (US); Dounia Berrada, Saratoga, CA (US); Sundeep Vaddadi, Los Gatos, CA (US); Kai Yu, San Francisco, CA (US); Balint Miklos, Zürich (CH); Severin Heiniger, Zürich (CH); Louis Wang, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 58 days.

(21) Appl. No.: 18/306,638

(22) Filed: Apr. 25, 2023

(65) Prior Publication Data
US 2024/0362279 A1    Oct. 31, 2024

(51) Int. Cl.
*G06F 16/9532* (2019.01)
*G06F 16/538* (2019.01)
*G06F 40/40* (2020.01)

(52) U.S. Cl.
CPC ........ *G06F 16/9532* (2019.01); *G06F 16/538* (2019.01); *G06F 40/40* (2020.01)

(58) Field of Classification Search
None
See application file for complete search history.

(56) References Cited

U.S. PATENT DOCUMENTS

| | | | |
|---|---|---|---|
| 8,463,719 B2* | 6/2013 | Lyon | G10L 25/48 706/12 |
| 8,788,434 B2 | 7/2014 | Makadia et al. | |
| 9,135,954 B2* | 9/2015 | Sitrick | G09G 5/377 |
| 9,571,713 B2* | 2/2017 | Basson | H04N 23/661 |
| 11,989,963 B2* | 5/2024 | Yoffe | G06F 40/30 |
| 2020/0250537 A1* | 8/2020 | Li | G06F 16/538 |
| 2023/0005471 A1* | 1/2023 | Wexler | G10L 15/183 |
| 2024/0126807 A1* | 4/2024 | Kharbanda | G06F 16/54 |

OTHER PUBLICATIONS

International Search Report and Written Opinion for Application No. PCT/US2024/024754, mailed Jul. 15, 2024, 13 pages.

* cited by examiner

*Primary Examiner* — Debbie M Le
(74) *Attorney, Agent, or Firm* — DORITY & MANNING P.A.

(57) ABSTRACT

A multimodal search system is described. The system can receive image data captured by a camera of a user device. Additionally, the system can receive audio data associated with the image data. The audio data can be captured by a microphone of the user device. Moreover, the system can process the image data to generate visual features. Furthermore, the system can process the audio data to generate a plurality of words. The system can generate a plurality of search terms based on the plurality of words and the visual features. Subsequently, the system can determine one or more search results associated with the plurality of search terms and provide the one or more search results as an output.

20 Claims, 14 Drawing Sheets

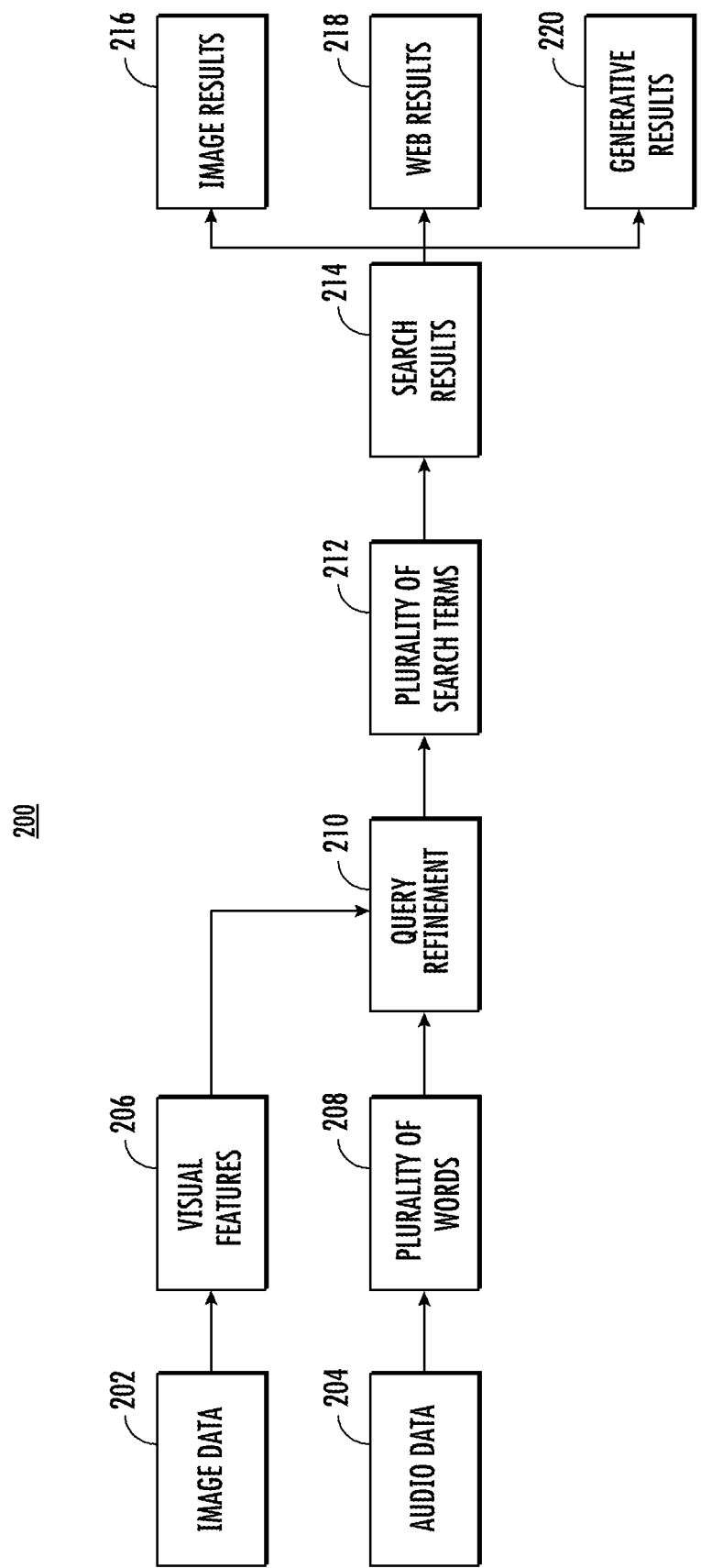

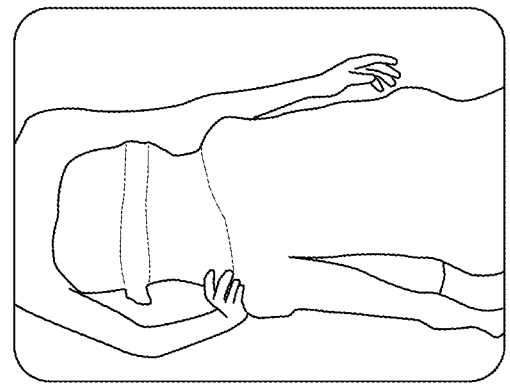
EXAMPLE 342
SHIRTS LIKE THIS WITH BIG FLOPPY COLLARS
344
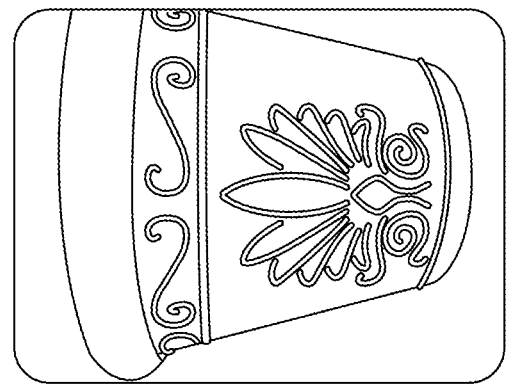
EXAMPLE 346
SPECIFIC PATTERN TO MATCH THE POT
348
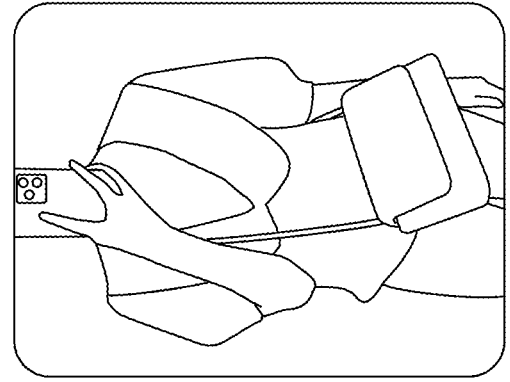
EXAMPLE 350
THIS DRESS IN A BLACK COLOR
352
340
FIG. 3B

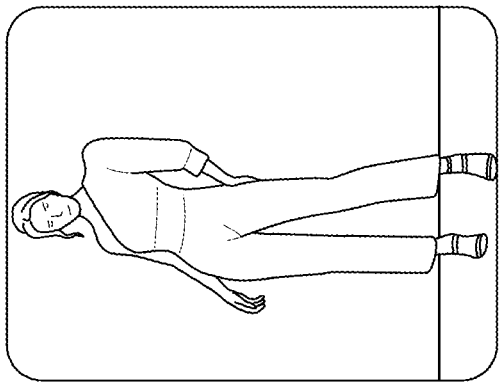
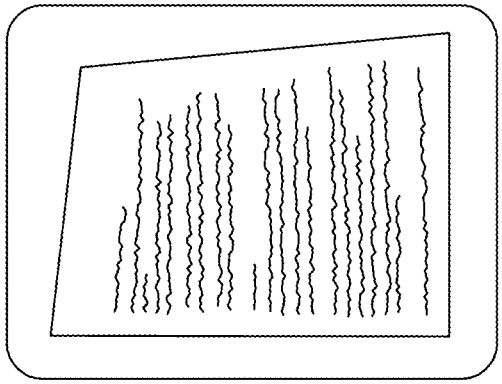
FIG. 3E

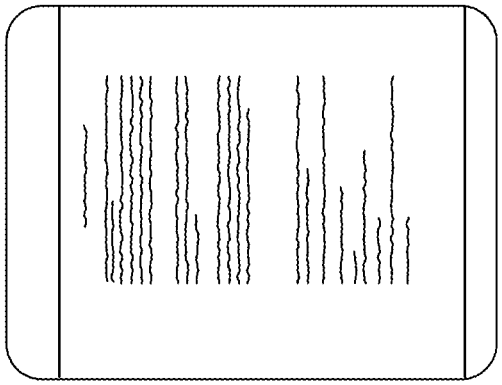
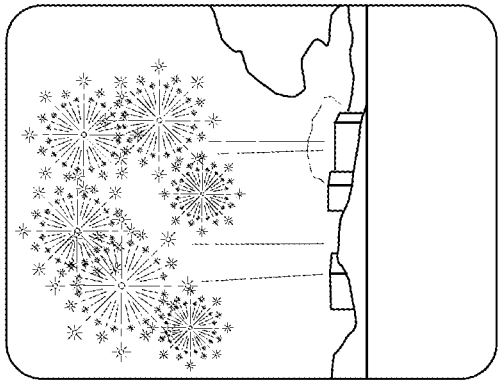
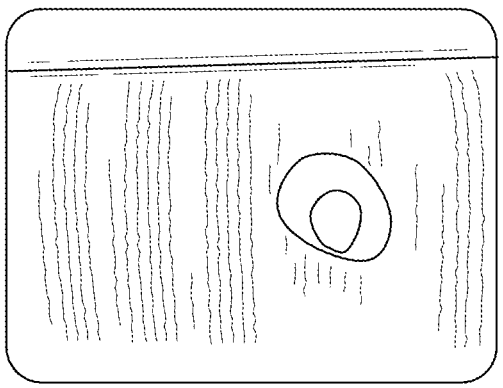
FIG. 3F

VISUAL AND AUDIO MULTIMODAL SEARCHING SYSTEM

FIELD

The present disclosure relates generally to processing multiple modalities (e.g., both visual data and audio data) in a search query to provide search results. More particularly, the present disclosure relates to multimodal searching based on visual data captured by a camera of a user device and audio data captured from a microphone of the user device.

BACKGROUND

In conventional systems, search queries can include text input or audio input to search for a particular item or a particular piece of knowledge. However, understanding the world at large can be difficult when the search request is limited to just text and audio data. Whether an individual is trying to understand what the object in front of them is, trying to determine where else the object can be found, or trying to determine where an image on the internet was captured from, text and audio searching alone can be difficult. In particular, users may struggle to determine which words to use. Additionally, the words may not be descriptive enough or abundant enough to generate desired results.

Additionally, the content being requested by the user may not be readily available to the user based on the user not knowing where to search. The user may be requesting search results without a clear way to express the concept.

Moreover, search results that are only based on text or audio input can be limited, because the user is limited by the mode of inputs to express their request. As a result, in conventional systems, when search results are not to the user's satisfaction because the search results are limited or incorrect, the user may have to post the content to social media or a discussion website in order to crowdsource the answer from other users.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for multimodal searching. The method can include receiving, by a computing system comprising one or more processors, image data captured by a camera of a user device. Additionally, the method can include receiving audio data associated with the image data. The audio data is captured by a microphone of the user device. Moreover, the method can include processing the image data to generate visual features. Furthermore, the method can include processing the audio data to generate a plurality of words. The method can also include generating a plurality of search terms based on the plurality of words and the visual features. Subsequently, the method can include determining one or more search results associated with the plurality of search terms, and providing the one or more search results as an output.

In some implementations, the plurality of search terms is generated based on a query refinement. In some implementations, the plurality of search terms is generated using one or more machine-learned models.

In some implementations, the plurality of search terms can be generated by replacing a word in the plurality of words with an updated word. The updated word can be derived from the visual features.

In some implementations, the method can include processing the audio data to generate an audio signature. Additionally, the one or more search results can be determined based on the plurality of search terms and the audio signature.

In some implementations, the method can include causing a presentation of the output on a graphical user interface. The graphical user interface can be presented on a display of the user device.

In some implementations, the audio data can be a refinement query or a pivot query. Additionally, determining the one or more search results includes processing the plurality of search terms to obtain one or more images. The one or more search results can include one or more images. Moreover, generating the plurality of search terms can include generating one or more text embeddings and one or more image embeddings. The text embeddings and the image embeddings can be combined and inputted into the image search machine-learned models to obtain the one or more images.

In some implementations, determining the one or more search results can include processing the plurality of search terms, using one or more image search machine-learned models, to obtain one or more images. The one or more search results that are provided as an output can include the one or more images. In some instances, the plurality of words can be text embeddings, and the visual features can be image embeddings. For example, the text embeddings and the image embeddings can be combined and inputted into the image search machine-learned models to generate the one or more images.

In some implementations, determining the one or more search results can include processing the plurality of search terms, using a web search engine, to obtain web results. The one or more search results that are provided as the output can include the web results. In some instances, the visual features can include object name, and the plurality of search terms are keywords derived from the plurality of words and the object name. In some instances, the visual features can include location data, and the plurality of search terms are keywords derived from the plurality of words and the location data.

In some implementations, determining the one or more search results can include processing the plurality of search terms, using one or more large language models (LLMs), to obtain generative results. The one or more search results that are provided as the output can include the generative results.

In some implementations, the method can include causing the presentation of the one or more search results on a display of the user device. Additionally, in response to the presentation, the method can include receiving updated image data captured by the camera of the user device. Moreover, the method can include detecting, using the one or more machine-learned models, updated visual features in the updated image data. Furthermore, the method can include determining one or more updated search results associated with the plurality of search terms and the updated visual features. Subsequently, the method can include providing the one or more updated search results as an updated output.

In some implementations, the method can include causing the presentation of the one or more search results on a display of the user device. In response to the presentation, the method can include receiving updated audio data captured by the microphone of the user device. Additionally, the method can include processing the updated audio data, using the one or more machine-learned models, to generate updated words. Moreover, the method can include determining one or more updated search results associated with the plurality of search terms and the updated words. Furthermore, the method can include providing the one or more updated search results as an updated output.

In some implementations, the audio data can include context information associated with an object in the image data. Additionally, the one or more search results can be further determined based on the context information. For example, the context information can be a brand name of the object. In another example, the context information can be a website that sells the object.

In some implementations, the audio data can include an attribute associated with an object in the image data. Additionally, the one or more search results can be further determined based on the attribute. For example, the attribute can be a color and/or a pattern associated with the object.

In some implementations, the context information can be a user-requested brand name and/or a user-requested website.

Another example aspect of the present disclosure is directed to a computing system for performing a multimodal search. The system can include one or more processors and one or more non-transitory computer-readable media that collectively store instructions that, when executed by the one or more processors, cause the computing system to perform operations. The operations can include receiving, by a computing system comprising one or more processors, image data captured by a camera of a user device. Additionally, the operations can include receiving audio data associated with the image data. The audio data is captured by a microphone of the user device. Moreover, the operations can include processing the image data to generate visual features. Furthermore, the operations can include processing the audio data to generate a plurality of words. The operations can also include generating a plurality of search terms based on the plurality of words and the visual features. Subsequently, the operations can include determining one or more search results associated with the plurality of search terms and providing the one or more search results as an output.

Another example aspect of the present disclosure is directed to one or more non-transitory computer-readable media that collectively store instructions that, when executed by one or more computing devices, cause the one or more computing devices to perform operations. The operations can include receiving, by a computing system comprising one or more processors, image data captured by a camera of a user device. Additionally, the operations can include receiving audio data associated with the image data. The audio data is captured by a microphone of the user device. Moreover, the operations can include processing the image data to generate visual features. Furthermore, the operations can include processing the audio data to generate a plurality of words. The operations can also include generating a plurality of search terms based on the plurality of words and the visual features. Subsequently, the operations can include determining one or more search results associated with the plurality of search terms and providing the one or more search results as an output.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 2 depicts a block diagram of an example multimodal search system according to example embodiments of the present disclosure.

FIGS. 3A-3G depict illustrations of example use cases of using the multimodal search system according to example embodiments of the present disclosure.

Figure 1:
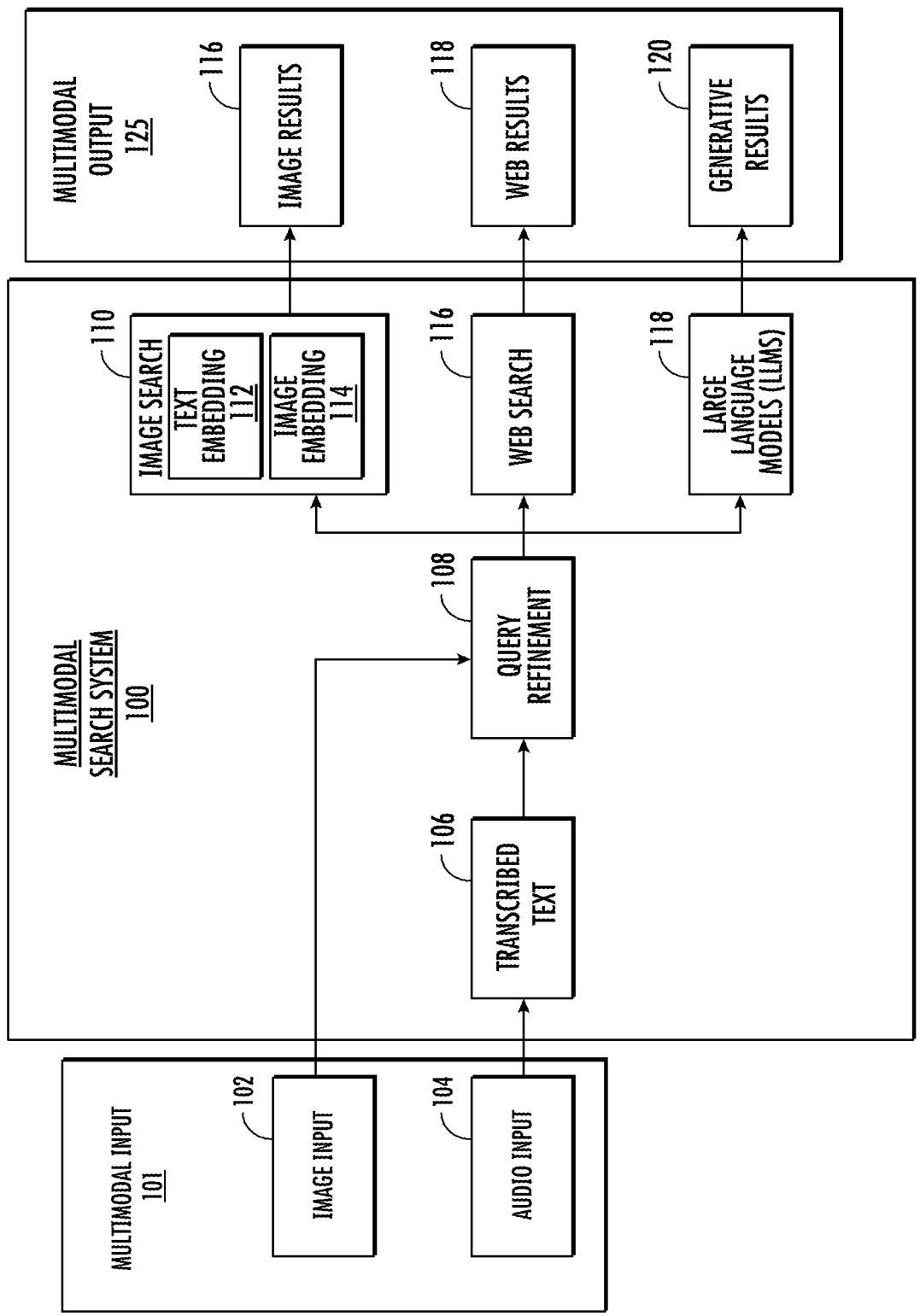
FIG. 1 depicts a block diagram of an example multimodal search system according to example embodiments of the present disclosure.

Reference numerals that are repeated across plural figures are intended to identify the same features in various implementations.

DETAILED DESCRIPTION

Overview

Generally, the present disclosure is directed to systems and methods for improving search results by using visual data and audio data as part of the search query. In particular, the systems and methods disclosed herein can leverage visual data and audio data to provide a multimodal (e.g., multisearch, search that combines audio and visual inputs) searching capabilities and a multimodal output.

For example, a user may take a picture of a rosemary plant, and simultaneously or subsequently, ask "what can I cook with this?" The techniques described herein can input the image data and the audio data into one or more machine-learned models to generate improved results. Continuing with this example, the system can determine that the object in the image is of a rosemary plant and replace the term "this" with "rosemary" and input this query in a web search to obtain web results for this query. In another example, a user can be using a live stream application and simultaneously have a searching application (e.g., viewfinder) open for the user to verbally submit a search request in relation to images captured in the live stream application. In yet another example, a user can verbally instruct a mobile phone or an assistant device to take a photo and issue a query, such as "hey take a photo and identify what is in the photo.

According to some embodiments, the system described herein improves the multimodal experience by reducing the friction in formulating a search query through the introduction of voice input of a user and an image captured by the user directly from a camera. The system enables a multimodal experience, which is a novel way for a user to formulate questions with multiple modalities (e.g., image and text, image and audio) at the same time. As a result, a user can search with multiple modes (e.g., image and text, image and audio, text and audio) at the same time. The system can enable the growth of info secking query streams and introduce new types of queries. Moreover, the system can utilize large language models (LLMs) to improve search results associated with opinion and action seeking queries. The system can utilize machine-learned models to present artificial intelligence (AI) generated answers and outputs.

The techniques described herein significantly reduce friction in formulating multimodal queries, which results in improved user experience. For example, the user experience can be improved by enabling a user to take a picture of a product with their mobile device and while also stating "add it to my shopping list." In response to this request, the system can determine the product being captured by the camera of the mobile device and add the product to a shopping list of the user.

Furthermore, by enabling new ways to input data for a search request, the system increases the search space for potential search results. By incorporating audio input in combination with image input, the system is able to increase the search space for potential search results, which in turn improves the user's experience. In some embodiments, the system transcribes the audio input into a plurality of words and combines the words with features extracted from the image data, which makes it easier for a user to perform a search. In some other embodiments, the system goes beyond transcription of the audio data and solves use cases that requires the system to truly understand audio along with the image. For example, when a user's dishwasher is making a specific whirring sound, describing that sound or issue in words can be difficult if not impossible. The system described herein can receive the audio data associated with the whirring sound along with the image of the dishwasher and return a search result for fixing the dishwasher. The system can determine the model and brand of the dishwasher from features extracted in the image of the dishwasher. Additionally, the system can determine that the audio data is associated with a clogged drain by extracting a signature from the audio data and determining that the signature of the audio data is similar to the signature of audio associated with a clogged drain for this specific model and brand. Continuing with this example, the search results can include that the dishwasher is a specific brand and model, the problem is the dishwasher is clogged, and present a video tutorial for fixing this problem. In some implementations, the search results can include augmented reality instructions to fix the problem with the dishwasher.

The systems and methods of the present disclosure provide a number of technical effects and benefits. As one example, the system and methods can improve search results by enabling multimodal searching capabilities. Additionally, by concurrently using image data (e.g., image embeddings) and audio data (e.g., text embeddings), the system can provide more accurate search results by enhancing the query with additional signals that provide helpful context for the search. For example, the word embeddings and the image embeddings can be real-valued vectors that encode the meaning of the word and/or image and can be searched concurrently in a multi-dimensional vector space to provide more accurate search results. Furthermore, by enabling multimodal searching capabilities, the system increases the search space for potential search results by now being able to perform searches that may have been impossible to perform before. As the clogged dishwasher example above highlights, a user is able to perform a search that may have been previously impossible, and the system is now able to provide tutorials on how to fix the problem by analyzing the audio and image data concurrently. In some instances, the search results are provided faster to the user by reducing the number of interactions with the user. In particular, the systems and methods disclosed herein can leverage an interactive user interface that enables a user to use both image data and audio data to provide better, faster, and more accurate search results. Furthermore, by only extracting a subset of known audio signatures from an audio database (e.g., accessing known audio signatures of a specific make and model of the dishwasher) that are associated with a visual feature that is extracted from the image data, and then comparing the input audio signature with this subset of known audio signatures, the search query can be performed faster than conventional systems in order to present the search results in real-time.

Another technical effect and benefit relate to improved computational efficiency and improvements in the functioning of a computing system. For example, the systems and methods disclosed herein can leverage the multimodal search system to provide a more comprehensive multimodal search query that can mitigate the use of additional searches and additional search result page browsing, which can save time, processing resources, energy, and computational power.

FIG. 1 depicts a block diagram of an example multimodal search system 100 according to example embodiments of the present disclosure. The multimodal search system 100 can receive a multimodal input 101 to generate a multimodal output 125. For example, the multimodal search system 100 can be an image-and-audio search system that processes image input 102 and voice input 104 to generate image results 116, web results 118, and/or generative results 120. The image input 102 can be captured by a camera of a user device. The audio input 104 can be captured by a microphone of the user device. Additionally, the audio input 104 can be associated with the image input 102.

According to some embodiments, the audio input 104 can be a plurality of words that is associated with a specific category, such as a search query, a question, an inquiry, a command, an action to be performed, a text string, and/or a response to a prompt. The system 100 can determine the multimodal output 125 based on the category of the audio input. For example, if the audio input 104 is a question (e.g., "what can I do with the object in this image"), then the multimodal output 125 can be a web result that is based on a web search 116. Alternatively, if the specific category is an action to be performed (e.g., summarize the text in this image), then the multimodal output 125 can be generative results 120 that is generated by large language models 118. In yet another alternative output, if the specific category is an image search query (e.g., find similar dresses like this image), then the multimodal output 125 can be image results 116 that is obtained from an image search 110. The image search 110 can be based on image features (e.g., image embedding 114) that a query refinement 108 determines from the image input 102. Additionally, the image search 110 can be based on text embeddings 112 and/or image embeddings that one or more machine-learned models determine from the audio input 104 and/or transcribed text 106. For example, the text embeddings 112 and the image embeddings 114 can be inputted into an image search 110 model (e.g., reverse image search engine, image classification model, convolution neural network (CNN) model) to provide a plurality of image results as an output to the image search 110.

Query refinement can include a process of reformulating a given query to improve retrieval performance in information retrieval operations, particularly in the context of query understanding. In the context of search engines, query refinement can involve determining a user's intent by evaluating user input (e.g., image input 102, audio input 104) and refining the search query based on the user's intent. Query refinement involves techniques such as: finding synonyms of words and searching for the synonyms as well; finding semantically related words (e.g. antonyms, meronyms, hyponyms, hypernyms); finding various morphological forms of words by stemming each word in the search query; fixing spelling errors and automatically searching for the corrected form; and re-weighting the terms in the original query.

In some instances, the system 100 can receive the multimodal input 101 and process the data to generate a multimodal output 125 that is dependent on the audio input 104. For example, the image input can be an image of a rosemary plant, and the audio input 104 can be the question "what can I make with this?" The system can convert the audio input 104 into transcribed text 106 using a machine-learned model (e.g., a Natural Language Processing (NLP) speech to text model). The transcribed text can be a plurality of words. In some instances, the transcribed text 106 and the image input 102 can both be inputted into query refinement 108 to replace one of the words in the transcribed text 106 with an updated word. The updated word can be derived from a visual feature of the image input. The machine-learned models can determine visual features (e.g., image embeddings 114) from the image input 102. In this example, one of the visual features that is determined can be that the image is of a rosemary plant. Thus, the query refinement 108 can replace the word "this" in the transcribed text 106 with the updated word "rosemary." Subsequently, the system 100 can perform a web search 116 based on the category of the audio input being a question. The web results 118 that are provided by the system 100 based on the web search 116 can be cooking instructions that include rosemary as an ingredient.

FIG. 2 depicts a block diagram of an example multimodal search system 200 according to example embodiments of the present disclosure. The multimodal search system 200 can process image data 202 (e.g., data derived from the image input 102) and audio data 204 (data derived from the voice input 104) to generate search results 214. The image data 202 can be transmitted by a user device of a user to the system 200 via a network. In some instances, the image data 202 can be an image of one or more objects. Alternatively, the image data can be of a plurality of images, where each image includes one or more objects. The audio data 204 can be an audio input associated with the image data 202. The audio data 204 can be captured by a microphone of the user device and transmitted to the system 200 via the network. In some instances, the camera and the microphone can be components of the same user device (e.g., mobile phone of a user). The audio data 204 is an audio input that can be transcribed into a plurality of words.

The system 200 can process the image data 202, using one or more machine-learned models, to generate visual features 206 (e.g., visual object, image embeddings 114). For example, the image data 202 can be inputted into an image classification machine-learned model to determine visual features 206 (e.g., objects in the image, image embeddings). Additionally, the system 200 can process the audio data 204 to generate a plurality of words 208. The audio data 204 can be transcribed, using a natural language processing model, to determine the plurality of words associated with the audio data 204. Subsequently, the visual features 206 and the plurality of words 208 are inputted into a query refinement 210 to generate a plurality of search terms 212. For example, the machine-learned model(s) can include a replacement model that replaces a word in the plurality of words 208 with an updated word, wherein the updated word is derived from the visual features 206. Furthermore, the system 200 can determine search results 214 based on the plurality of search terms and provide the search results 214 as an output. The search results 214 can include image results 216, web results 216, and generative results 220. The search results 214 can be based on a category of the audio data 204 and/or a category of the image data 202, as previously discussed in FIG. 1.

The plurality of search terms can be generated (e.g., determined) by the query refinement 210 using the information derived from the image data 202, the audio data 204, and/or historical data (not pictured in FIG. 2) of the user. Additionally and/or alternatively, the plurality of search terms can be generated by the machine-learned models using the information derived from the image data 202, the audio data 204, and/or historical data of the user. For example, the historical data can be descriptive of past interactions by users when one or more particular words were used. In some implementations, the user and/or a plurality of users may refine search results to images when using the one or more particular words. Alternatively and/or additionally, the one or more particular words may be often used in describing images (e.g., in image captions). The one or more particular words can be determined to be associated with the visual features 206 based on a common association with images and/or with image features. In some implementations, the natural language meaning of the word or phrase may be utilized to determine that the one or more particular words are associated with the visual intent.

Additionally and/or alternatively, the machine-learned models can be utilized to determine the one or more words in the plurality of words 208. The one or more words in the plurality of words can be associated with the visual features 206. The machine-learned models can transcribe the audio data to text data, parse the text data, classify the parsed text data, and generate the plurality of words 208 that is associated with the image data 202 and/or visual features 206. Alternatively and/or additionally, the machine-learned models can include a natural language processing model that can process the audio data 204 as a whole and/or in various syntactically determined segments to generate the plurality of words 208.

Example Use Cases

According to some implementations, the multimodal search system 200 can be utilized in a plurality of use cases. The type of use cases can include a refinement query, a pivot query, or an information seeking query. In some instances, the search results 214 (e.g., image results 216, web results 218, generative results 220) can be dependent on the type of use cases. The type of use cases can be determined based on the audio data 204 and/or image data 202. Additionally, with the system 100, 200 being able to receive voice input 104 and/or audio data 204, a user is able to have a more conversational dialogue with the system 100, 200, instead of having the user simply typing in keywords.

Figure 3A:
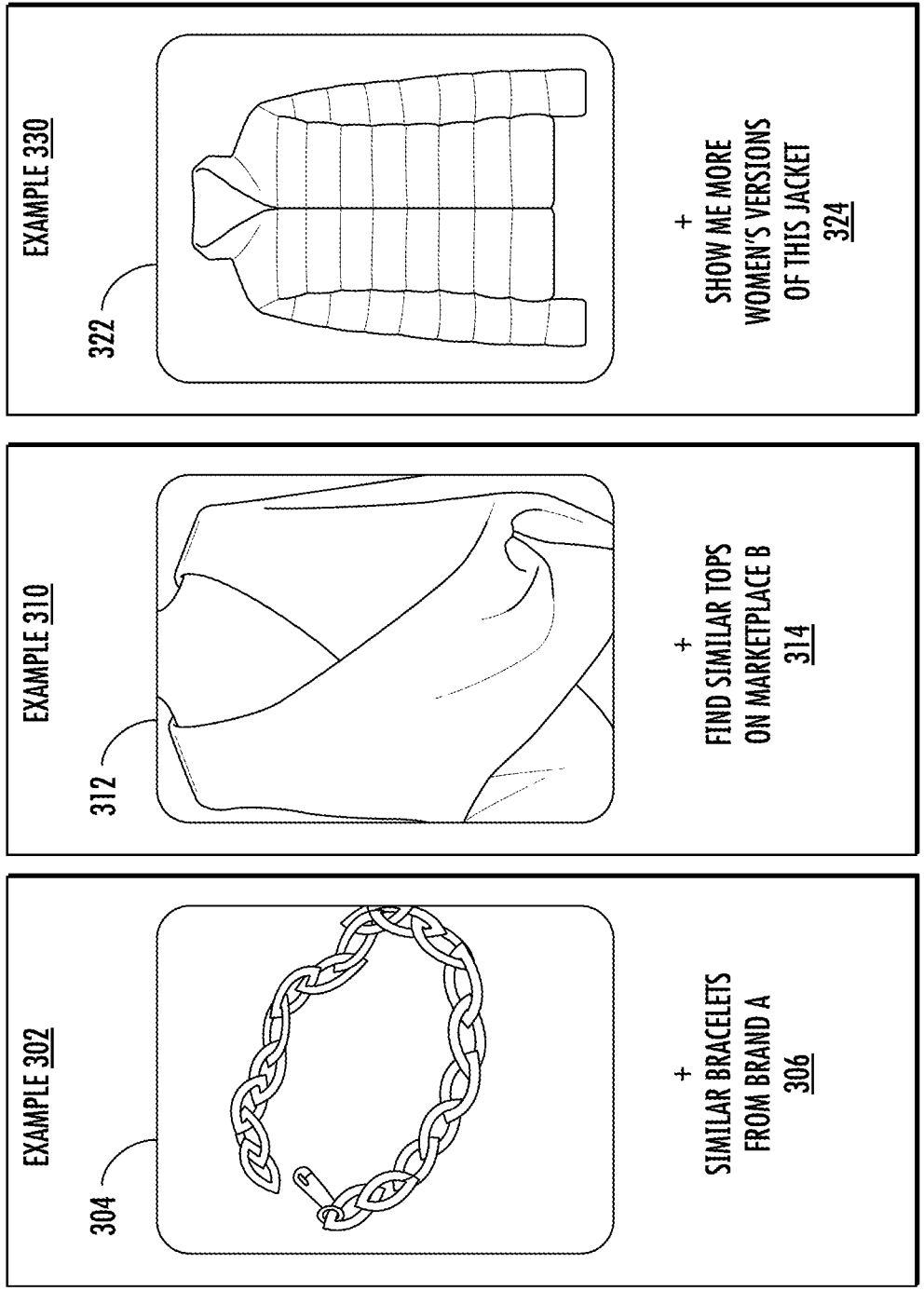

In the first category of use cases, the system can perform a refinement query as illustrated in illustration 300 in FIG. 3A. In the refinement query, the user can provide additional context information that is not apparent from the image alone, and the search results can be tailored based on the context information. In some instances, the context information can be a brand or a department. For example, as illustrated in example 302 in FIG. 3A, the system can receive an image 304 of a bracelet and an audio input 306 stating to find "similar bracelets from jewelry brand A." In example 302, the system can determine that the context information is that the bracelet is from "Brand A," which may not be apparent from image 304 of the bracelet. Similarly in example 310, the system can receive an image 312 of a top and an audio input 314 stating "find similar tops on marketplace B." In example 310, the system can determine that the context information is that the user wants to purchase a similar top on "marketplace B." In example 330, the system can receive an image 322 of a jacket, and an audio input 324 stating to "show me more women's versions of this jacket." In example 330, the context information can be determined to be that the jacket returned in the search results should be from the "women's" department. As described herein, the context information can be an embedding (e.g., text embedding 112) that is used by the machine-learned model during an image search (e.g., image search 110) in addition to the image embeddings (e.g., image embeddings 114) that are obtained from the received images 304, 312, 322.

In a second category of use cases, the system can perform a pivot query as illustrated in illustration 340 in FIG. 3B. In the pivot query, a user can describe a user preference (e.g., like, dislike) associated with an object in an image. In example 342, the user preference can be an attribute 344 (e.g., collars of a shirt) of an object. In example 346, the user preference can be a specific pattern 348 of an object. In example 350, the user preference can be a color 352 of an object in the image. As described in these examples, the user preference can include visual attributes, color pivoting, or color refinement. In example 346, the system can determine the pattern in the image to generate an image embedding 114 associated with this specific pattern. Additionally, the text embedding 112, for example 346 can be "flowerpot" and both the image embeddings 114 and the text embeddings 112 can be inputted into an image search 110 to obtain image results 116.

In a third category of use cases, the system can perform an information seeking query, such as "I want to do or ask something more with this image and want to express that." Within information seeking use cases, there can be a plurality of subcategories, which include answer seeking, tutorial seeking, opinion seeking, action seeking, and local seeking.

Figure 3C:
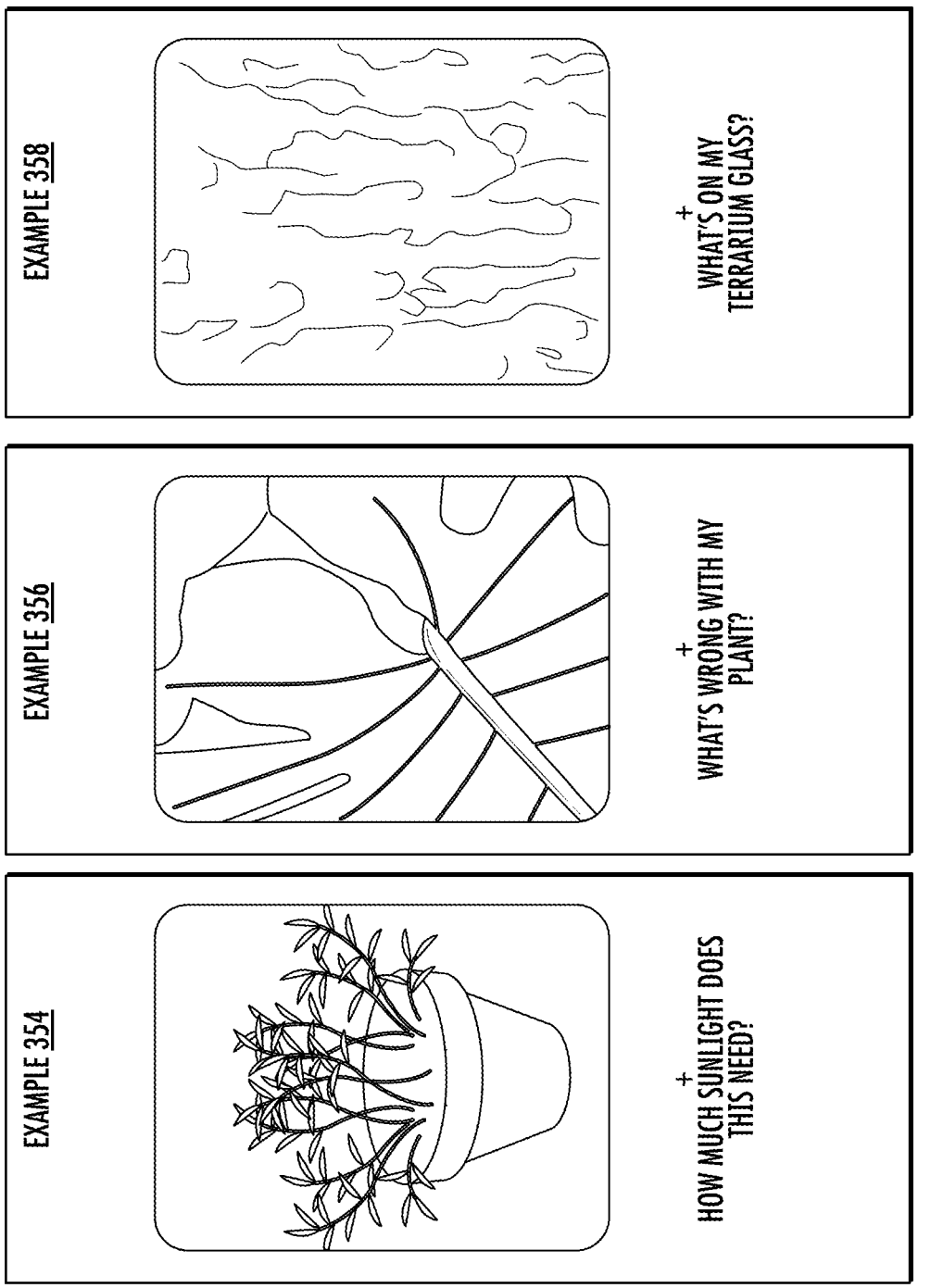

In FIG. 3C, the system can perform answer seeking queries of the information seeking use cases, as illustrated in examples 354, 356, and 358. In the answer seeking queries, a user may request an answer to a long tail question about the object, such as "how much sunlight does this need?" In example 354, the specific plant depicted in the image can replace the word "this" in the audio input such that the search query inputted into the machine-learned model can be "how much sunlight does plant A need?" In example 354, the system can perform a web search 116 to determine an answer the question "how much sunlight does plant A need?"

Figure 3D:
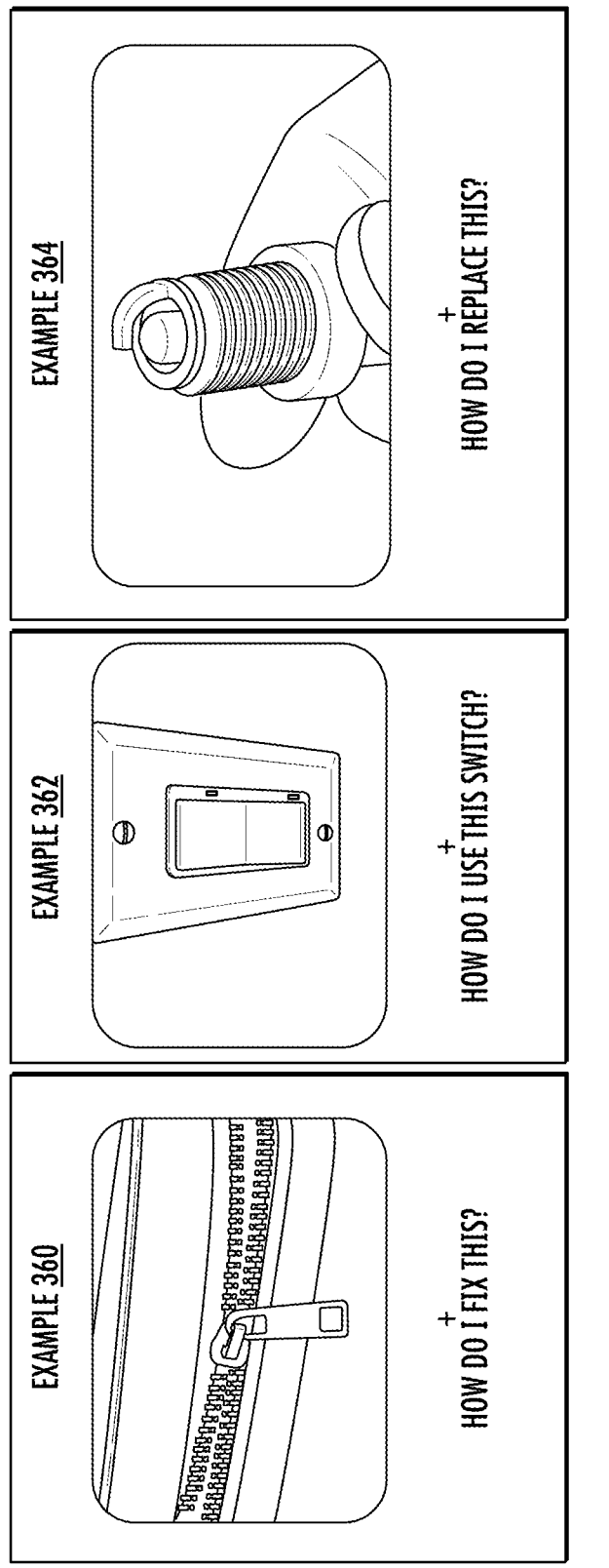

In FIG. 3D, the system can perform tutorial seeking queries of the information seeking use cases, as illustrated in examples 360, 362, and 364. In the tutorial seeking queries, the system can provide a tutorial to perform a task associated with an object in the image data when a user wants to perform an action with an object and an image, and the user is seeking a tutorial for performing this action. In example 360, the user can ask how to fix the object in the image. In this example, the system can determine what is the object in the image and what is the issue with the object in the image, and then perform a web search 116 based on this determination.

In FIG. 3E, the system can perform opinion seeking queries of the information seeking use cases, as illustrated in example 366, 368, and 370. For example, the system can provide an opinion about an object when a user. In example 366, a user can upload a picture of an outfit and ask whether this outfit can be worn to a formal party. In this example, the system can determine the type of outfit and visual features (e.g., image embeddings) of the image, and perform an image search 110 and/or a web search 116 to determine an answer to this question.

Figure 3G:
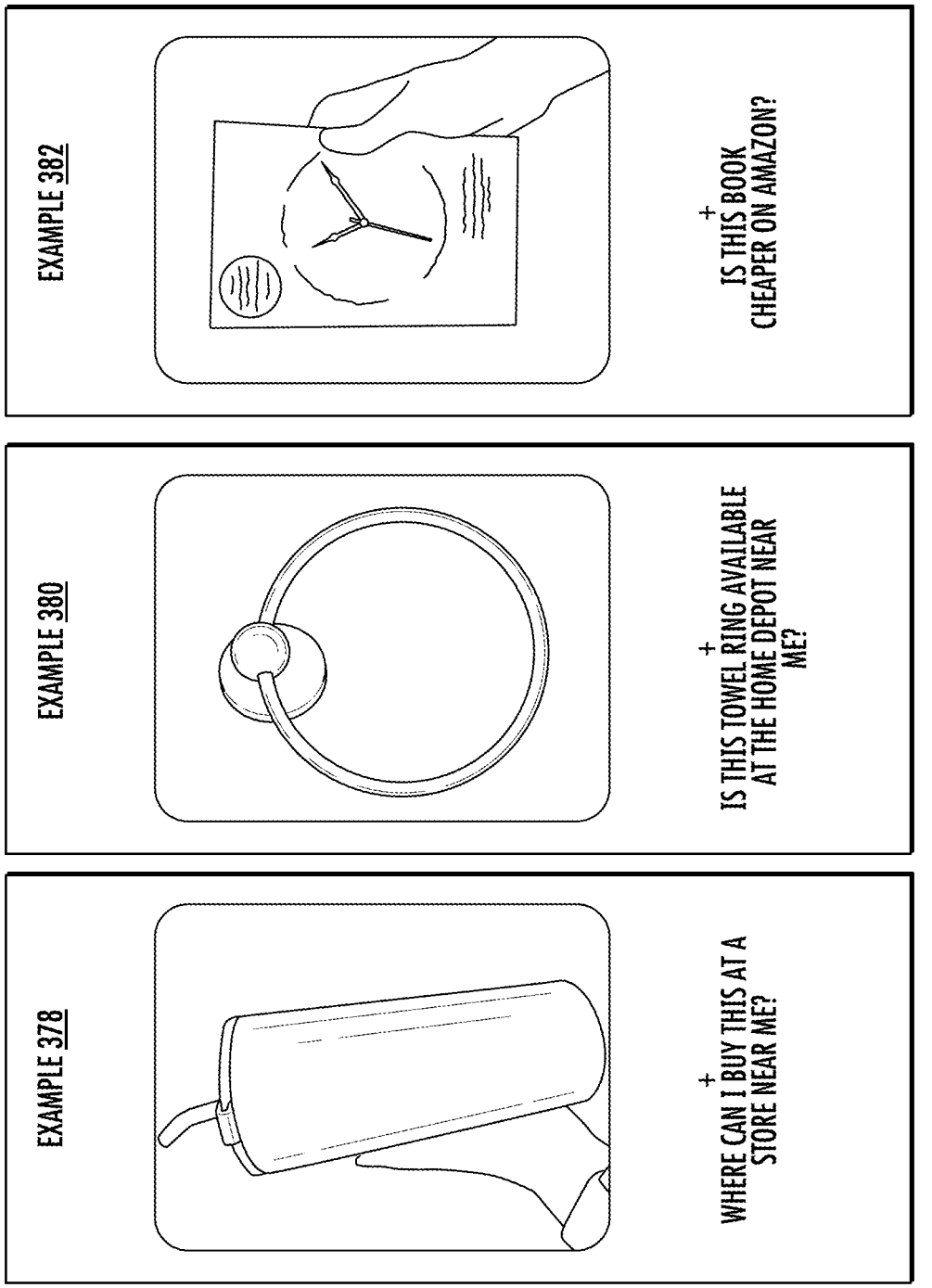

In FIG. 3G, the system can perform action seeking queries of the information seeking use cases, as illustrated in example 372, 374, and 376. For example, a user may submit a query request to the multimodal search system to perform an action on the image. In response to the request, the system can provide search results associated with the object detected in the image. In example 372, a user can request the system to summarize an image of a page in a book. The system, using LLMs 118, can generate a summary of the page in the book and output the summary as the search result.

In FIG. 3H, the system can perform location seeking queries of the information seeking use cases, as illustrated in example 378, 380, and 382. For example, a user may request local information about the object in the image. In some instances, the image may include metadata, such as time information and location information. In example 378, the voice input can be "where can I buy this at a store near me?" In response to the request, the system can determine location data (e.g., location of the object, location of the user, location of where the image was taken) based on the metadata of the image. The system can provide web results 118 to this query by using a web search 116 based on the location data, the image input 102, and the audio input 104.

With reference now to the Figures, example embodiments of the present disclosure will be discussed in further detail.

Example Methods

Figure 4:
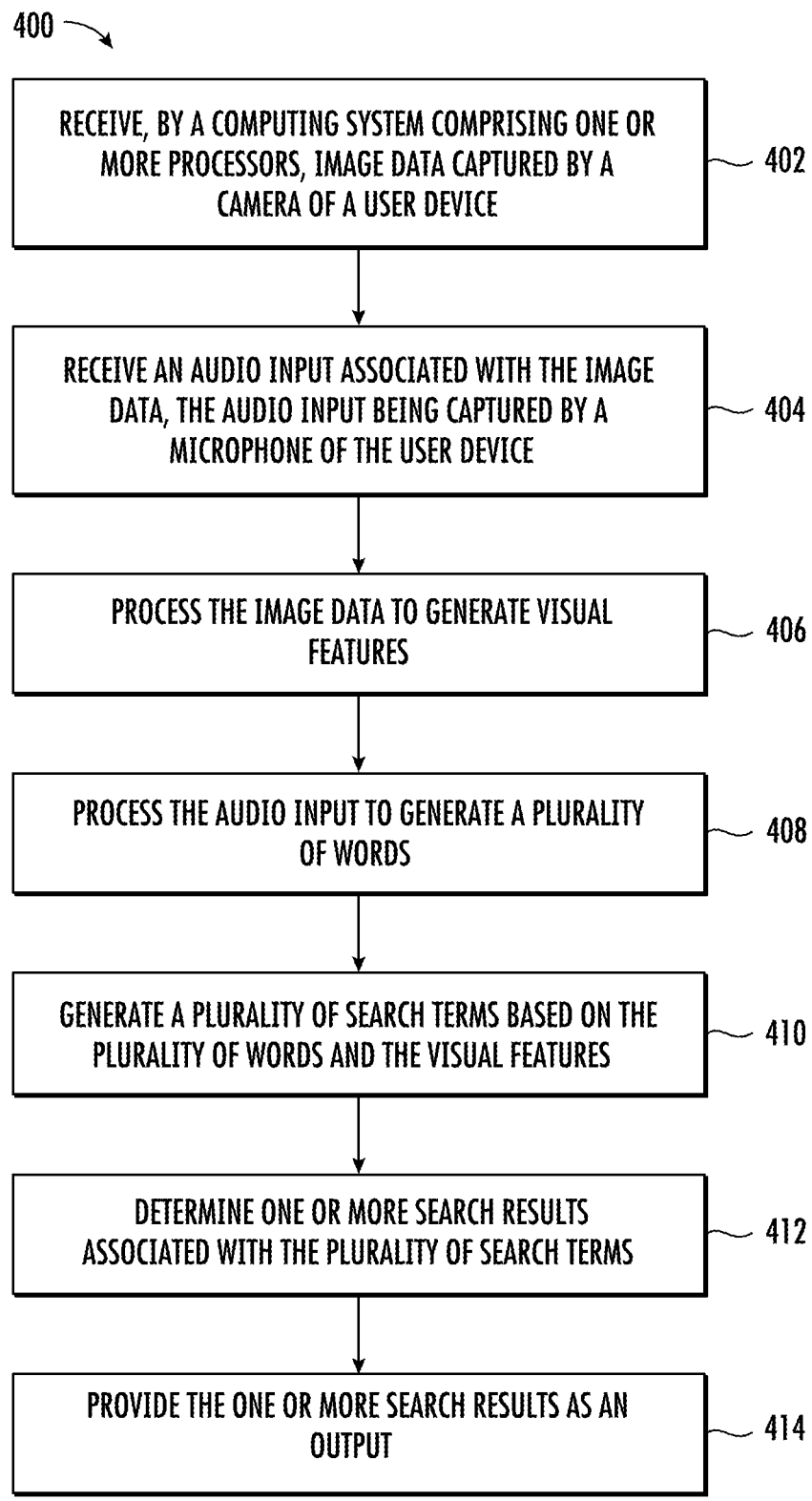
FIG. 4 depicts a flow chart diagram of an example method to perform a multimodal search according to example embodiments of the present disclosure.

FIG. 4 depicts a flow chart diagram of an example method to perform according to example embodiments of the present disclosure. Although FIG. 4 depicts steps performed in a particular order for purposes of illustration and discussion, the methods of the present disclosure are not limited to the particularly illustrated order or arrangement. The various steps of method 400 can be omitted, rearranged, combined, and/or adapted in various ways without deviating from the scope of the present disclosure.

The method 400 can be performed by a computing system such as the multimodal search system 100 in FIG. 1, the multimodal search system 200, server computing system 730, sensor processing system 60, or output determination system 80.

At 402, a computing system (e.g., multimodal search system 100, 200, server computing system 730) can receive image data captured by a camera of a user device. The image data can be the image input 102 in FIG. 1 and/or the image data 202 in FIG. 2. The image data can be derived from an image captured by the camera of the user device. The image data can also include metadata associated with the image, such as location data, time data, and/or personal user data. In some instances, the user device at 402 can be the user computing system 702 in FIG. 7A or the user computing system 52 in FIG. 7B.

At 404, the computing system can receive audio data associated with the image data. The audio data can be captured by a microphone of the user device. The audio data can be the voice input 104 in FIG. 1 and/or audio data 204 in FIG. 2. Additionally, the audio data can be the audio input example 306, 314, 324 described in FIGS. 3A-3G.

At 406, the computing system can process the image data to generate visual features. In some instances, the image data can be processed by a machined-learned model to extract a visual feature (e.g., image embedding 114) as described in FIGS. 1 and 2. In some instances, the query refinement 108 in FIG. 1, the query refinement 210 in FIG. 2, the machine-learned models 720 and the machine-learned models 740 in FIG. 7A, the sensor processing system 60, and the output determination system 80 in FIG. 7B can perform operation 406. The visual feature can include an image embedding. The image embedding can be a lower-dimensional representation of the image. The image embedding can include a dense vector representation of the image which can be used for many tasks such as classification. For example, a convolutional neural network (CNN) can be used to create and/or extract the image embedding from the image data.

In some implementations, image data may be processed with one or more embedding models to generate one or more visual features (e.g., image embeddings 114). For example, one or more images can be processed with the one or more embedding models to generate one or more image embeddings 114 in an embedding space. The one or more image embeddings may be associated with one or more visual features of the one or more images. In some implementations, the one or more embedding models may be configured to process multimodal data to generate multimodal embeddings. The one or more embeddings can be utilized for classification, search, and/or learning embedding space distributions.

At 408, the computing system can process the audio data to generate a plurality of words. In some instances, the audio data can be processed by a natural language processing (NLP) model to generate the plurality of words as described in FIGS. 1 and 2. Alternatively, or additionally, the computing system can process the audio data to generate an input audio signature. For example, the computing system can process the audio data of a clogged dishwasher to generate an input audio signature associated with the noise of the clogged dishwasher. In some instances, the machine-learned models 108 in FIG. 1, the machine-learned models 210 in FIG. 2, the machine-learned models 720 and the machine-learned models 740 in FIG. 7A, the sensor processing system 60, and the output determination system 80 in FIG. 7B can perform operation 408. Additionally, the NLP model can utilize a set of statistical techniques for identifying parts of speech, entities, sentiment, and other aspects of text. Furthermore, the NLP model can rely on machine learning to automatically learn rules by analyzing a set of examples (i.e. a large corpus) and make a statistical inference with regards to the audio data in order to generate the plurality of words. The machine-learned model (e.g., NLP model) can generate text embeddings based on the audio data and/or plurality of words.

At 410, the computing system can generate, using one or more machine-learned models, a plurality of search terms based on the plurality of words and the visual features. In some instances, the plurality of search terms can be a combination of text embeddings and image embeddings that are inputted into an image search (e.g., image search 110) to generate image results. In some implementations, the plurality of search terms can be generated by replacing a word in the plurality of words with an updated word. The updated word can be derived from the visual features. For example, as previously mentioned, a user may take a picture of a rosemary plant, and subsequently ask "what can I cook with this?" The system can determine that the object in the image is of a rosemary plant at 406 and replace the term "this" with "rosemary" at 410.

Figure 7A:
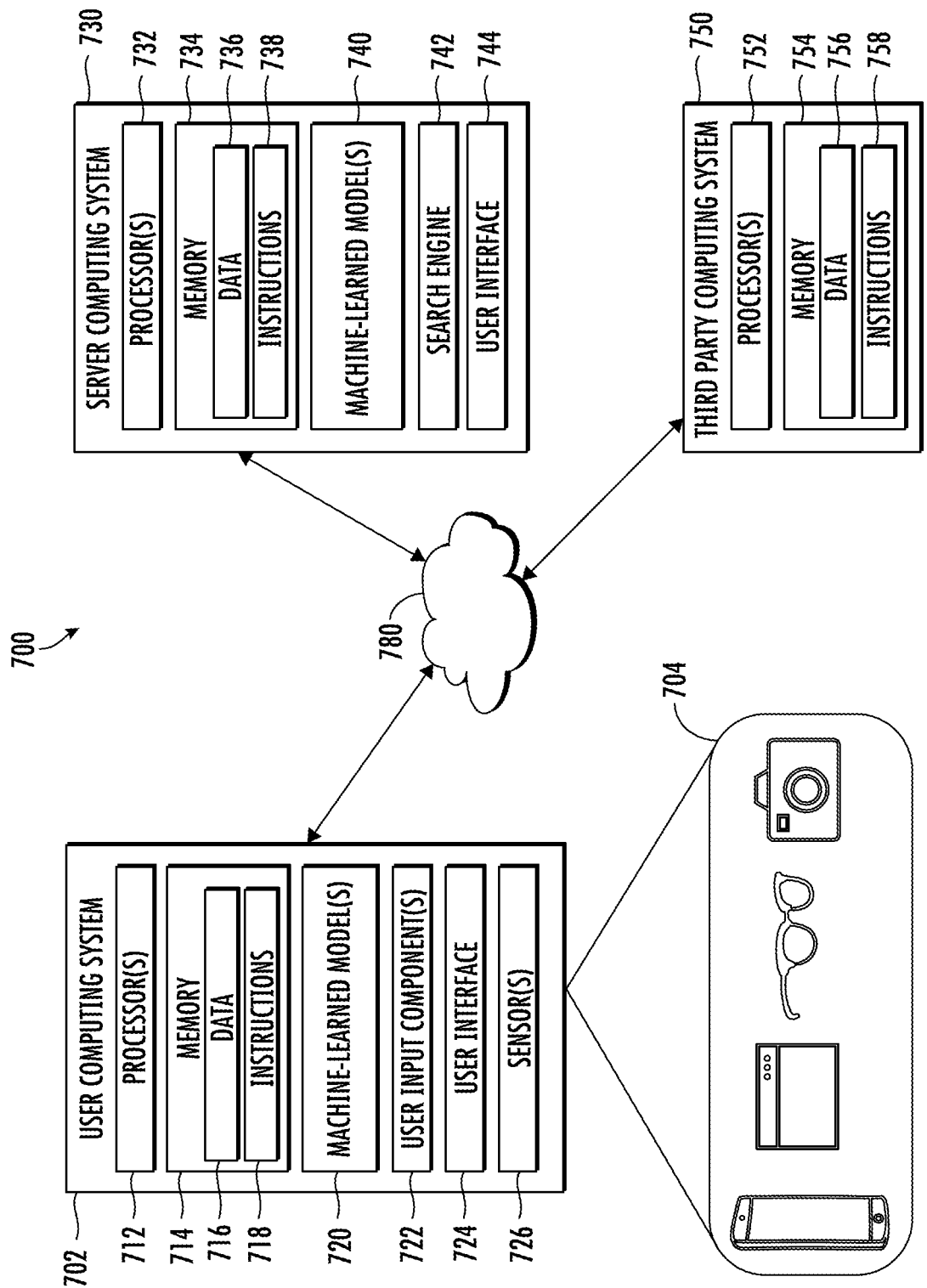
FIG. 7A depicts a block diagram of an example computing system that performs a multimodal search according to example embodiments of the present disclosure.
Figure 7B:
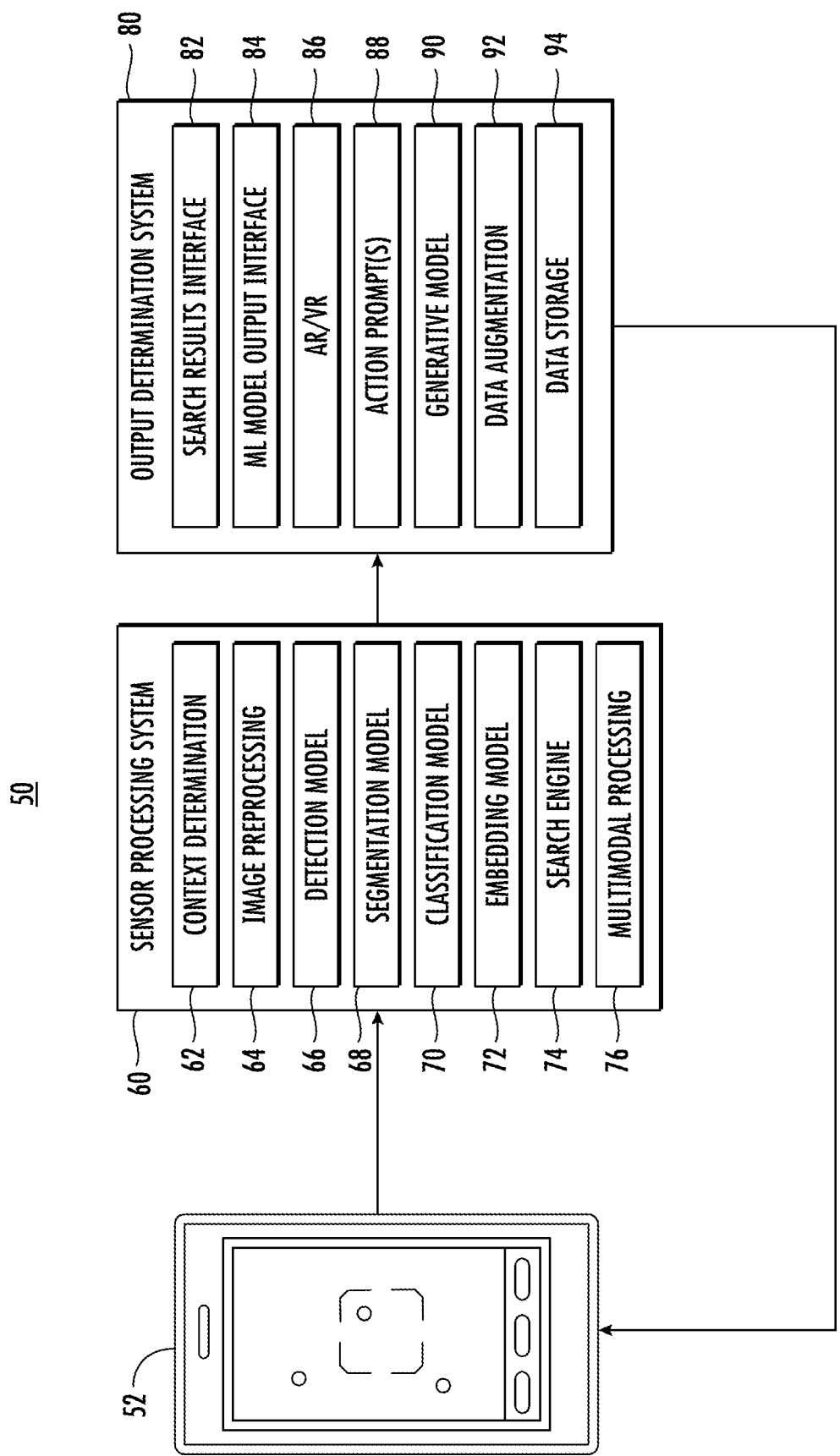
FIG. 7B depicts a block diagram of an example computing system that performs a multimodal search according to example embodiments of the present disclosure.

In some instances, the machine-learned models 108 in FIG. 1, the machine-learned models 210 in FIG. 2, the machine-learned models 720 and the machine-learned models 740 in FIG. 7A, the sensor processing system 60, and the output determination system 80 in FIG. 7B can perform operation 410.

At 412, the computing system can determine one or more search results associated with the plurality of search terms. In some implementations, the search results can be determined by a category of the audio input. For example, the search results can include image results that are determined from an image search when the audio input is categorized by the machine-learned model as a refinement query or a pivot query. In another example, the search results can include web results that are determined from a web search when the audio input is categorized by the machine-learned model as an information seeking query, opinion seeking query, answer seeking query, tutorial seeking query, or location seeking query. In yet another example, the search results can include generative results 120 that are determined from LLMs when the audio input is categorized by the machine-learned model as an action seeking query. FIGS. 3A-3G provides different use cases based on the category of the audio input.

In some implementations, the computing system can further process the audio data at 408 to generate an input audio signature. Additionally, the one or more search results that are determined at 412 can be based on the plurality of search terms and the input audio signature. For example, the computing system can determine that the audio signature (e.g., input audio signature) is similar or matches a known audio signature of a known audio file stored in an audio signature database. The audio signature database can be stored in memory 734 of the server computing system 730 and/or memory 754 of a third-party computing system 750. The system can access known audio files (e.g., plurality of known audio signatures) from the audio database (e.g., audio signature database) based on a visual feature extracted from the image data. For example, the extracted visual feature can be a make and model of the dishwasher or a make and model of a vehicle, and the plurality of known audio signatures can be associated with known audio data for that specific make and model. By only accessing known audio signatures based on the extracted visual features, the search can be performed faster, and in turn, the search results can be presented quickly to a user. The input audio signature can be compared with the known audio signature to determine a comparison score (e.g., similarity value), and the system can determine a matching audio signature that is similar to the input audio signature when the comparison score exceeds a threshold value. The threshold value can be dynamically updated by the machine learned model based on user interaction with the search results. In another embodiment, the system can access, from an audio signature database a plurality of known audio signatures based a visual feature from the generated visual features and select a matching audio signature from the known audio signatures when a comparison score of the matching audio signature exceeds a threshold value. The matching score of the matching audio signature can be calculated by comparing the input audio signature with the matching audio signature. In yet another example, the system can calculate a comparison score for each known audio signature in the plurality of known audio signature and select the known audio signature with the highest comparison score as the matching audio signature.

For example, in the clogged dishwasher use case, the system can process the audio input associated with the whirring sound to generate an input audio signature. The system can determine the make and model of the dishwasher based on the extracted features of the image data. Additionally, the system can access the known audio files that are associated with the extracted features of the image data (e.g., the make and model of the dishwasher) from an audio database. By only extracting and comparing the known audio files for the specific make and model of the dishwasher, the search can be performed quickly, and the results can be presented in real-time. Subsequently, the known signatures of the known audio files associated with the specific make and model of the dishwasher are compared with the input audio signature to calculate a similarity value for each known signature. The system can determine that the input audio signature is similar to a first known signature associated with a first known audio file when the similarity value exceeds a threshold value. In this example, the first known audio file can be associated with a clogged drain. As a result, the system can determine one or more search results at 412 based on the plurality of search terms and the input audio signature, where in this example indicates that the dishwasher is clogged. The search results can include a video tutorial of how to fix the clogged dishwasher or augmented reality instructions for fixing the clogged dishwasher.

In some implementations, determining the one or more search results can include processing the plurality of search terms, using one or more image search machine-learned models, to obtain one or more images. The one or more search results that are provided as an output can include one or more images. In some instances, the plurality of words can be text embeddings, and the visual features can be image embeddings. For example, the text embeddings and the image embeddings can be combined and inputted into the image search machine-learned models to generate the one or more images.

In some implementations, determining the one or more search results can include processing the plurality of search terms, using a web search engine, to obtain web results. The one or more search results that are provided as the output can include the web results. In some instances, the visual features can include object name, and the plurality of search terms are keywords derived from the plurality of words and the object name. In some instances, the visual features can include location data, and the plurality of search terms are keywords derived from the plurality of words and the location data.

In some implementations, determining the one or more search results can include processing the plurality of search terms, using one or more large language models (LLMs), to obtain generative results. The one or more search results that are provided as the output can include the generative results.

In some implementations, the audio data can include context information associated with an object in the image data. Additionally, the one or more search results can be further determined based on the context information. For example, the context information can be a brand name of the object. In another example, the context information can be a website that sells the object. In some instances, the context information can be a user-requested brand name and/or a user-requested website.

In some implementations, the audio data can include an attribute associated with an object in the image data. Additionally, the one or more search results can be further determined based on the attribute. For example, the attribute can be a color and/or a pattern associated with the object.

At 414, the computing system can provide the one or more search results as an output.

In some implementations, the plurality of search terms can be generated by replacing a word in the plurality of words with an updated word. The updated word can be derived from the visual features.

In some implementations, the output can be determined by a category of the audio input. For example, the output can include image results that are determined from an image search when the audio input is categorized by the machine-learned model as a refinement query or a pivot query. In another example, the output can include web results that are determined from a web search when the audio input is categorized by the machine-learned model as an information seeking query, opinion seeking query, answer seeking query, tutorial seeking query, or location seeking query. In yet another example, the output can include generative results 120 that are determined from LLMs when the audio input is categorized by the machine-learned model as an action seeking query.

In some implementations, the one or more search results at 412 can be web results, image results, and/or generative results. Similarly, the output at 414 can be image results, web results, and/or generative results. The one or more search results and/or output is based on a category of the audio data as previously described in the use cases in FIGS. 3A-G.

In some implementations, the method can include causing a presentation of the output on a graphical user interface. The graphical user interface can be presented on a display of the user device.

In some implementations, the method can include causing the presentation of the one or more search results on a display of the user device. Additionally, in response to the presentation, the method can include receiving updated image data captured by the camera of the user device. Moreover, the method can include detecting, using the one or more machine-learned models, updated visual features in the updated image data. Furthermore, the method can include determining one or more updated search results associated with the plurality of search terms and the updated visual features. Subsequently, the method can include providing the one or more updated search results as an updated output.

In some implementations, the method can include causing the presentation of the one or more search results on a display of the user device. In response to the presentation, the method can include receiving updated audio data captured by the capture of the user device. Additionally, the method can include processing the updated audio data, using the one or more machine-learned models, to generate updated words. Moreover, the method can include determining one or more updated search results associated with the plurality of search terms and the updated words. Furthermore, the method can include providing the one or more updated search results as an updated output.

Figure 5:
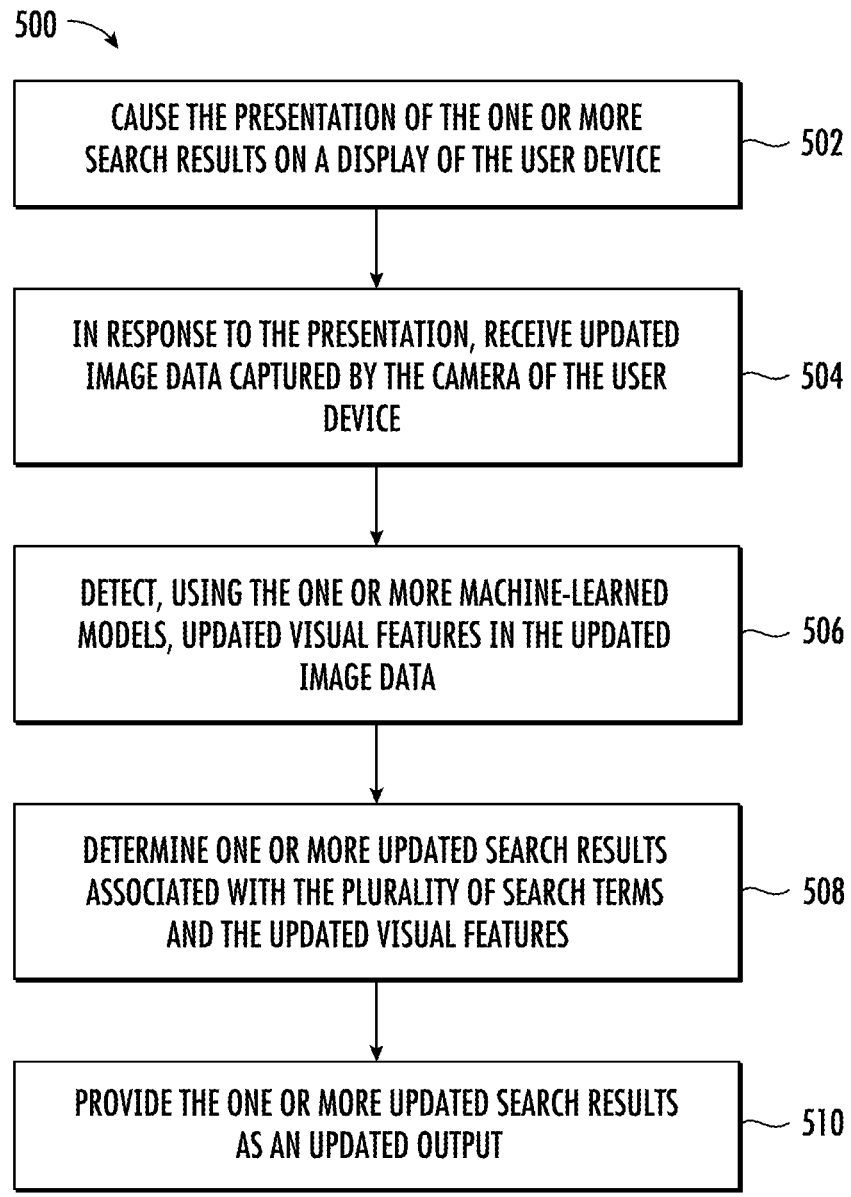
FIG. 5 depicts a flow chart diagram of an example method to perform a subsequent multimodal search in response to receiving updated image data according to example embodiments of the present disclosure.

FIG. 5 depicts a flow chart diagram of an example method to perform a subsequent multimodal search in response to receiving updated image data according to example embodiments of the present disclosure. Although FIG. 5 depicts steps performed in a particular order for purposes of illustration and discussion, the methods of the present disclosure are not limited to the particularly illustrated order or arrangement. The various steps of method 500 can be omitted, rearranged, combined, and/or adapted in various ways without deviating from the scope of the present disclosure.

The method 500 can be performed by a computing system such as the multimodal search system 100 in FIG. 1, the multimodal search system 200, server computing system 730, sensor processing system 60, or output determination system 80.

At 502, a computing system can cause the presentation of one or more search results on a display of the user device.

At 504, in response to the presentation, the system can receive updated image data captured by the camera of the user device.

At 506, the system can detect, using the one or more machine-learned models, updated visual features in the updated image data. In some instances, the query refinement 108 in FIG. 1, the query refinement 210 in FIG. 2, the machine-learned models 720 and the machine-learned models 740 in FIG. 7A, the sensor processing system 60, and the output determination system 80 in FIG. 7B can perform operation 506.

At 508, the system can determine one or more updated search results associated with the plurality of search terms and the updated visual features.

At 510, the system can provide the one or more updated search results as an updated output.

Figure 6:
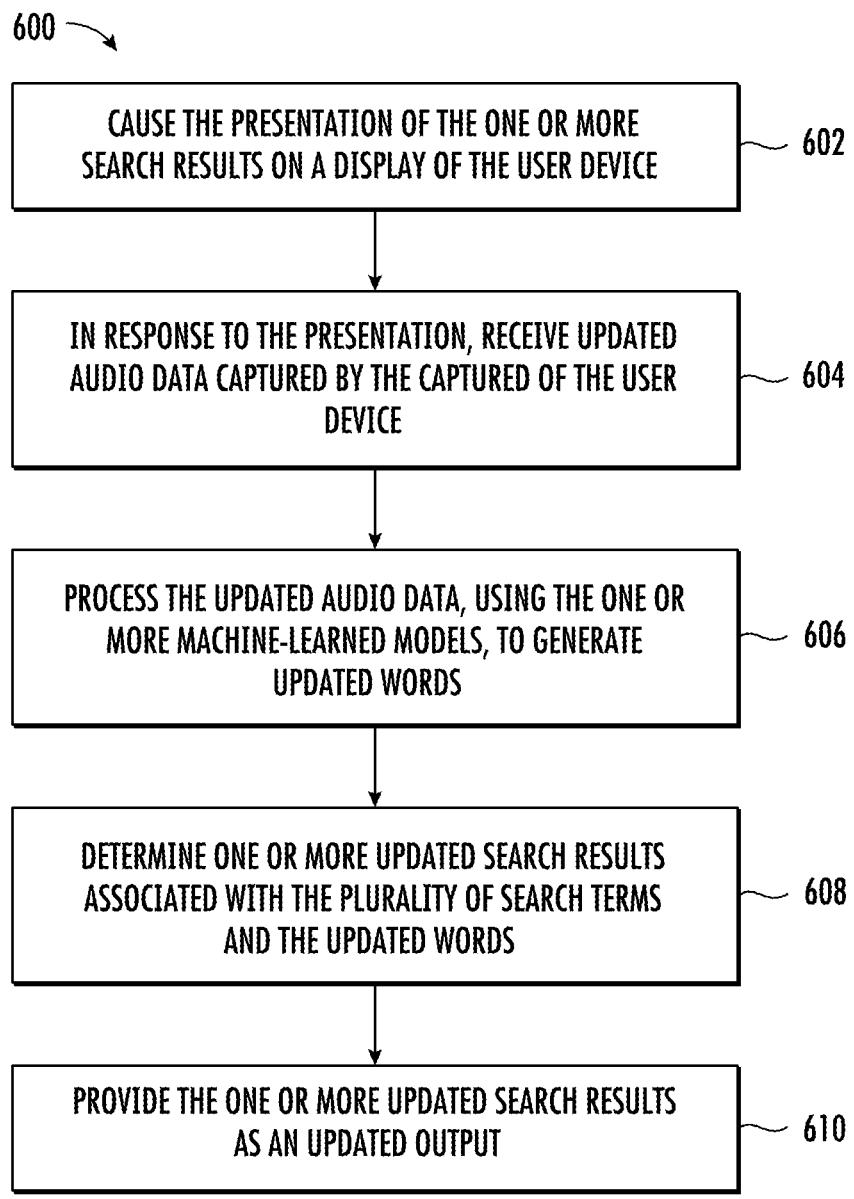
FIG. 6 depicts a flow chart diagram of an example method to perform a subsequent multimodal search in response to receiving updated audio data according to example embodiments of the present disclosure.

FIG. 6 depicts a flow chart diagram of an example method to perform a subsequent multimodal search in response to receiving updated audio data according to example embodiments of the present disclosure. Although FIG. 6 depicts steps performed in a particular order for purposes of illustration and discussion, the methods of the present disclosure are not limited to the particularly illustrated order or arrangement. The various steps of method 600 can be omitted, rearranged, combined, and/or adapted in various ways without deviating from the scope of the present disclosure.

The method 600 can be performed by a computing system such as the multimodal search system 100 in FIG. 1, the multimodal search system 200, server computing system 730, sensor processing system 60, or output determination system 80.

At 602, a computing system can cause the presentation of one or more search results on a display of the user device.

At 604, in response to the presentation, the computing system can receive updated audio data captured by the capture of the user device.

At 606, the computing system can process the updated audio data, using the one or more machine-learned models, to generate updated words. In some instances, the query refinement 108 in FIG. 1, the query refinement 210 in FIG. 2, the machine-learned models 720 and the machine-learned models 740 in FIG. 7A, the sensor processing system 60, and the output determination system 80 in FIG. 7B can perform operation 606.

At 608, the computing system can determine one or more updated search results associated with the plurality of search terms and the updated words.

At 610, the computing system can provide the one or more updated search results as an updated output.

FIG. 7A depicts a block diagram of an example computing system 100 that performs a multimodal search according to example embodiments of the present disclosure. The system 700 includes a user computing system 702, a server computing system 730, and/or a third computing system 750 that are communicatively coupled over a network 780.

The user computing system 702 can include any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing system 702 includes one or more processors 712 and a memory 714. The one or more processors 712 can be any suitable processing device (e.g., a processor core, a microprocessor, an ASIC, a FPGA, a controller, a microcontroller, etc.) and can be one processor or a plurality of processors that are operatively connected. The memory 714 can include one or more non-transitory computer-readable storage mediums, such as RAM, ROM, EEPROM, EPROM, flash memory devices, magnetic disks, etc., and combinations thereof. The memory 714 can store data 716 and instructions 718 which are executed by the processor 712 to cause the user computing system 702 to perform operations.

In some implementations, the user computing system 702 can store or include one or more machine-learned models 720. For example, the machine-learned models 720 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. The machine-learned models 720 can be an example of the query refinement 108 in FIG. 1, the query refinement 210 in FIG. 2, and/or the machine-learned models used in methods 400, 500, and 600.

In some implementations, the one or more machine-learned models 720 can be received from the server computing system 730 over network 780, stored in the user computing device memory 714, and then used or otherwise implemented by the one or more processors 712. In some implementations, the user computing system 702 can implement multiple parallel instances of a single machine-learned model 720 (e.g., to perform parallel machine-learned model processing across multiple instances of input data and/or detected features).

More particularly, the one or more machine-learned models 720 may include one or more detection models, one or more classification models, one or more segmentation models, one or more augmentation models, one or more generative models, one or more natural language processing models, one or more optical character recognition models, and/or one or more other machine-learned models. The one or more machine-learned models 720 can include one or more transformer models. The one or more machine-learned models 720 may include one or more neural radiance field models, one or more diffusion models, and/or one or more autoregressive language models.

The one or more machine-learned models 720 may be utilized to detect one or more object features. The detected object features may be classified and/or embedded. The classification and/or the embedding may then be utilized to perform a search to determine one or more search results. Alternatively and/or additionally, the one or more detected features may be utilized to determine an indicator (e.g., a user interface element that indicates a detected feature) is to be provided to indicate a feature has been detected. The user may then select the indicator to cause a feature classification, embedding, and/or search to be performed. In some implementations, the classification, the embedding, and/or the searching can be performed before the indicator is selected.

In some implementations, the one or more machine-learned models 720 can process image data, text data, audio data, and/or latent encoding data to generate output data that can include image data, text data, audio data, and/or latent encoding data. The one or more machine-learned models 720 may perform optical character recognition, natural language processing, image classification, object classification, text classification, audio classification, context determination, action prediction, image correction, image augmentation, text augmentation, sentiment analysis, object detection, error detection, inpainting, video stabilization, audio correction, audio augmentation, and/or data segmentation (e.g., mask based segmentation).

Additionally or alternatively, one or more machine-learned models 740 can be included in or otherwise stored and implemented by the server computing system 730 that communicates with the user computing system 702 according to a client-server relationship. For example, the machine-learned models 740 can be implemented by the server computing system 740 as a portion of a web service (e.g., a viewfinder service, a visual search service, an image processing service, an ambient computing service, and/or an overlay application service). Thus, one or more models 720 can be stored and implemented at the user computing system 702 and/or one or more models 740 can be stored and implemented at the server computing system 730.

The user computing system 702 can also include one or more user input components 722 that receives user input (e.g., image input 102, audio input 104). For example, the user input component 722 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

In some implementations, the user computing system can store and/or provide one or more user interfaces 724, which may be associated with one or more applications. The one or more user interfaces 724 can be configured to receive inputs and/or provide data for display (e.g., image data, text data, audio data, one or more user interface elements, an augmented-reality experience, a virtual reality experience, and/or other data for display. The user interface 724 may be associated with one or more other computing systems (e.g., server computing system 730 and/or third party computing system 750). The user interfaces 724 can include a viewfinder interface, a search interface, a generative model interface, a social media interface, and/or a media content gallery interface.

The user computing system 702 may include and/or receive data (e.g., image data 202, audio data 204) from one or more sensors 726. The one or more sensors 726 may be housed in a housing component that houses the one or more processors 712, the memory 714, and/or one or more hardware components, which may store, and/or cause to perform, one or more software packets. The one or more sensors 726 can include one or more image sensors (e.g., a camera), one or more lidar sensors, one or more audio sensors (e.g., a microphone), one or more inertial sensors (e.g., inertial measurement unit), one or more biological sensors (e.g., a heart rate sensor, a pulse sensor, a retinal sensor, and/or a fingerprint sensor), one or more infrared sensors, one or more location sensors (e.g., GPS), one or more touch sensors (e.g., a conductive touch sensor and/or a mechanical touch sensor), and/or one or more other sensors. The one or more sensors can be utilized to obtain data associated with a user's environment (e.g., an image of a user's environment, a recording of the environment, and/or the location of the user).

The user computing system 702 may include, and/or pe part of, a user computing device 704. The user computing device 704 may include a mobile computing device (e.g., a smartphone or tablet), a desktop computer, a laptop computer, a smart wearable, and/or a smart appliance. Additionally and/or alternatively, the user computing system may obtain from, and/or generate data with, the one or more one or more user computing devices 704. For example, a camera of a smartphone may be utilized to capture image data descriptive of the environment, and/or an overlay application of the user computing device 704 can be utilized to track and/or process the data being provided to the user. Similarly, one or more sensors associated with a smart wearable may be utilized to obtain data about a user and/or about a user's environment (e.g., image data can be obtained with a camera housed in a user's smart glasses). Additionally and/or alternatively, the data may be obtained and uploaded from other user devices that may be specialized for data obtainment or generation.

The server computing system 730 includes one or more processors 732 and a memory 734. The one or more processors 732 can be any suitable processing device (e.g., a processor core, a microprocessor, an ASIC, a FPGA, a controller, a microcontroller, etc.) and can be one processor or a plurality of processors that are operatively connected. The memory 734 can include one or more non-transitory computer-readable storage mediums, such as RAM, ROM, EEPROM, EPROM, flash memory devices, magnetic disks, etc., and combinations thereof. The memory 734 can store data 736 and instructions 738 which are executed by the processor 732 to cause the server computing system 730 to perform operations.

In some implementations, the server computing system 730 includes or is otherwise implemented by one or more server computing devices. In instances in which the server computing system 730 includes plural server computing devices, such server computing devices can operate according to sequential computing architectures, parallel computing architectures, or some combination thereof.

As described above, the server computing system 730 can store or otherwise include one or more machine-learned models 740. For example, the models 740 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 740 are discussed with reference to FIG. 7B. The machine-learned models 740 can be an example of the query refinement 108 in FIG. 1, the query refinement 210 in FIG. 2, and/or the machine-learned models used in methods 400, 500, and 600.

Additionally and/or alternatively, the server computing system 730 can include and/or be communicatively connected with a search engine 742 that may be utilized to crawl one or more databases (and/or resources). The search engine 742 can process data from the user computing system 702, the server computing system 730, and/or the third party computing system 750 to determine one or more search results associated with the input data. The search engine 742 may perform term based search, label based search, Boolean based searches, image search, embedding based search (e.g., nearest neighbor search), multimodal search, and/or one or more other search techniques.

The server computing system 730 may store and/or provide one or more user interfaces 744 for obtaining input data and/or providing output data to one or more users. The one or more user interfaces 744 can include one or more user interface elements, which may include input fields, navigation tools, content chips, selectable tiles, widgets, data display carousels, dynamic animation, informational pop-ups, image augmentations, text-to-speech, speech-to-text, augmented-reality, virtual-reality, feedback loops, and/or other interface elements.

The user computing system 702 and/or the server computing system 730 can train the models 720 and/or 740 via interaction with the third party computing system 750 that is communicatively coupled over the network 780. The third party computing system 750 can be separate from the server computing system 730 or can be a portion of the server computing system 730. Alternatively and/or additionally, the third party computing system 750 may be associated with one or more web resources, one or more web platforms, one or more other users, and/or one or more contexts.

The third party computing system 750 can include one or more processors 752 and a memory 754. The one or more processors 752 can be any suitable processing device (e.g., a processor core, a microprocessor, an ASIC, a FPGA, a controller, a microcontroller, etc.) and can be one processor or a plurality of processors that are operatively connected. The memory 754 can include one or more non-transitory computer-readable storage mediums, such as RAM, ROM, EEPROM, EPROM, flash memory devices, magnetic disks, etc., and combinations thereof. The memory 754 can store data 756 and instructions 758 which are executed by the processor 752 to cause the third party computing system 750 to perform operations. In some implementations, the third party computing system 750 includes or is otherwise implemented by one or more server computing devices.

The network 780 can be any type of communications network, such as a local area network (e.g., intranet), wide area network (e.g., Internet), or some combination thereof and can include any number of wired or wireless links. In general, communication over the network 780 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data (e.g., image data 202). The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data (e.g., audio data 204). The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be sensor data (e.g., image data 202, audio data 204). The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the input includes visual data (e.g., image data 202) and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

The user computing system may include a number of applications (e.g., applications 1 through N). Each application may include its own respective machine learning library and machine-learned model(s). For example, each application can include a machine-learned model. Example applications include a text messaging application, an email application, a dictation application, a virtual keyboard application, a browser application, etc.

Each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

The user computing system 702 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing system 700.

The central intelligence layer can communicate with a central device data layer. The central device data layer can be a centralized repository of data for the computing system 700. The central device data layer may communicate with a number of other components of the computing device, such as, for example, one or more sensors, a context manager, a device state component, and/or additional components. In some implementations, the central device data layer can communicate with each device component using an API (e.g., a private API).

FIG. 7B depicts a block diagram of an example computing system 50 that performs a multimodal search according to example embodiments of the present disclosure. In particular, the example computing system 50 can include one or more computing devices 52 that can be utilized to obtain, and/or generate, one or more datasets that can be processed by a sensor processing system 60 and/or an output determination system 80 to feedback to a user that can provide information on features in the one or more obtained datasets. The one or more datasets can include image data, text data, audio data, multimodal data, latent encoding data, etc. The one or more datasets may be obtained via one or more sensors associated with the one or more computing devices 52 (e.g., one or more sensors in the computing device 52). Additionally and/or alternatively, the one or more datasets can be stored data and/or retrieved data (e.g., data retrieved from a web resource). For example, images, text, and/or other content items may be interacted with by a user. The interaction with content items can then be utilized to generate one or more determinations.

The one or more computing devices 52 can obtain, and/or generate, one or more datasets based on image capture, sensor tracking, data storage retrieval, content download (e.g., downloading an image or other content item via the internet from a web resource), and/or via one or more other techniques. The one or more datasets can be processed with a sensor processing system 60. The sensor processing system 60 may perform one or more processing techniques using one or more machine-learned models, one or more search engines, and/or one or more other processing techniques. The one or more processing techniques can be performed in any combination and/or individually. The one or more processing techniques can be performed in series and/or in parallel. In particular, the one or more datasets can be processed with a context determination block 62, which may determine a context associated with one or more content items. The context determination block 62 may identify and/or process metadata, user profile data (e.g., preferences, user search history, user browsing history, user purchase history, and/or user input data), previous interaction data, global trend data, location data, time data, and/or other data to determine a particular context associated with the user. The context can be associated with an event, a determined trend, a particular action, a particular type of data, a particular environment, and/or another context associated with the user and/or the retrieved or obtained data.

The sensor processing system 60 may include an image preprocessing block 64. The image preprocessing block 64 may be utilized to adjust one or more values of an obtained and/or received image to prepare the image to be processed by one or more machine-learned models and/or one or more search engines 74. The image preprocessing block 64 may resize the image, adjust saturation values, adjust resolution, strip and/or add metadata, and/or perform one or more other operations.

In some implementations, the sensor processing system 60 can include one or more machine-learned models, which may include a detection model 66, a segmentation model 68, a classification model 70, an embedding model 72, and/or one or more other machine-learned models. For example, the sensor processing system 60 may include one or more detection models 66 that can be utilized to detect particular features in the processed dataset. In particular, one or more images can be processed with the one or more detection models 66 to generate one or more bounding boxes associated with detected features in the one or more images.

Additionally and/or alternatively, one or more segmentation models 68 can be utilized to segment one or more portions of the dataset from the one or more datasets. For example, the one or more segmentation models 68 may utilize one or more segmentation masks (e.g., one or more segmentation masks manually generated and/or generated based on the one or more bounding boxes) to segment a portion of an image, a portion of an audio file, and/or a portion of text. The segmentation may include isolating one or more detected objects and/or removing one or more detected objects from an image.

The one or more classification models 70 can be utilized to process image data, text data, audio data, latent encoding data, multimodal data, and/or other data to generate one or more classifications. The one or more classification models 70 can include one or more image classification models, one or more object classification models, one or more text classification models, one or more audio classification models, and/or one or more other classification models. The one or more classification models 70 can process data to determine one or more classifications.

In some implementations, data may be processed with one or more embedding models 72 to generate one or more embeddings (e.g., text embeddings 112, image embeddings 114). For example, one or more images can be processed with the one or more embedding models 72 to generate one or more image embeddings (e.g., image embeddings 114) in an embedding space. The one or more image embeddings may be associated with one or more image features of the one or more images. In some implementations, the one or more embedding models 72 may be configured to process multimodal data to generate multimodal embeddings. The one or more embeddings can be utilized for classification, search, and/or learning embedding space distributions.

The sensor processing system 60 may include one or more search engines 74 that can be utilized to perform one or more searches. The one or more search engines 74 may crawl one or more databases (e.g., one or more local databases, one or more global databases, one or more private databases, one or more public databases, one or more specialized databases, and/or one or more general databases) to determine one or more search results. The one or more search engines 74 may perform feature matching, text based search, embedding based search (e.g., k-nearest neighbor search), metadata based search, multimodal search, web resource search, image search, text search, and/or application search.

Additionally and/or alternatively, the sensor processing system 60 may include one or more multimodal processing blocks 76, which can be utilized to aid in the processing of multimodal data. The one or more multimodal processing blocks 76 may include generating a multimodal query and/or a multimodal embedding to be processed by one or more machine-learned models and/or one or more search engines 74.

The output(s) of the sensor processing system 60 can then be processed with an output determination system 80 to determine one or more outputs to provide to a user. The output determination system 80 may include heuristic based determinations, machine-learned model based determinations, user selection based determinations, and/or context based determinations.

The output determination system 80 may determine how and/or where to provide the one or more search results in a search results interface 82. Additionally and/or alternatively, the output determination system 80 may determine how and/or where to provide the one or more machine-learned model outputs in a machine-learned model output interface 84. In some implementations, the one or more search results and/or the one or more machine-learned model outputs may be provided for display via one or more user interface elements. The one or more user interface elements may be overlayed over displayed data. For example, one or more detection indicators may be overlayed over detected objects in a viewfinder. The one or more user interface elements may be selectable to perform one or more additional searches and/or one or more additional machine-learned model processes. In some implementations, the user interface elements may be provided as specialized user interface elements for specific applications and/or may be provided uniformly across different applications. The one or more user interface elements can include pop-up displays, interface overlays, interface tiles and/or chips, carousel interfaces, audio feedback, animations, interactive widgets, and/or other user interface elements.

Additionally and/or alternatively, data associated with the output(s) of the sensor processing system 60 may be utilized to generate and/or provide an augmented-reality experience and/or a virtual-reality experience 86. For example, the one or more obtained datasets may be processed to generate one or more augmented-reality rendering assets and/or one or more virtual-reality rendering assets, which can then be utilized to provide an augmented-reality experience and/or a virtual-reality experience 86 to a user. The augmented-reality experience may render information associated with an environment into the respective environment. Alternatively and/or additionally, objects related to the processed dataset(s) may be rendered into the user environment and/or a virtual environment. Rendering dataset generation may include training one or more neural radiance field models to learn a three-dimensional representation for one or more objects.

In some implementations, one or more action prompts 88 may be determined based on the output(s) of the sensor processing system 60. For example, a search prompt, a purchase prompt, a generate prompt, a reservation prompt, a call prompt, a redirect prompt, and/or one or more other prompts may be determined to be associated with the output(s) of the sensor processing system 60. The one or more action prompts 88 may then be provided to the user via one or more selectable user interface elements. In response to a selection of the one or more selectable user interface elements, a respective action of the respective action prompt may be performed (e.g., a search may be performed, a purchase application programming interface may be utilized, and/or another application may be opened).

In some implementations, the one or more datasets and/or the output(s) of the sensor processing system 60 may be processed with one or more generative models 90 to generate a model-generated content item that can then be provided to a user. The generation may be prompted based on a user selection and/or may be automatically performed (e.g., automatically performed based on one or more conditions, which may be associated with a threshold amount of search results not being identified).

The output determination system 80 may process the one or more datasets and/or the output(s) of the sensor processing system 60 with a data augmentation block 92 to generate augmented data. For example, one or more images can be processed with the data augmentation block 92 to generate one or more augmented images. The data augmentation can include data correction, data cropping, the removal of one or more features, the addition of one or more features, a resolution adjustment, a lighting adjustment, a saturation adjustment, and/or other augmentation.

In some implementations, the one or more datasets and/or the output(s) of the sensor processing system 60 may be stored based on a data storage block 94 determination.

The output(s) of the output determination system 80 can then be provided to a user via one or more output components of the user computing device 52. For example, one or more user interface elements associated with the one or more outputs can be provided for display via a visual display of the user computing device 52.

The processes may be performed iteratively and/or continuously. One or more user inputs to provide user interface elements may condition and/or affect successive processing loops.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

Additional Disclosure

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A computer-implemented method for multimodal searching, the method comprising:
    receiving, by a computing system comprising one or more processors, image data captured by a camera of a user device;
    receiving audio data associated with the image data, the audio data being captured by a microphone of the user device;
    processing the image data to generate visual features;
    processing the audio data to generate a plurality of words and an input audio signature, the input audio signature being associated with an object in the image data;
    generating a plurality of search terms based on the plurality of words and the visual features, wherein the plurality of search terms is generated by replacing a word in the plurality of words with an updated word, the updated word being derived from the visual features;
    determining, based on the input audio signature, one or more search results associated with the plurality of search terms; and
    providing the one or more search results as an output.

2. The method of claim 1, wherein the determination of the one or more search results, comprises:
    accessing, from an audio signature database a plurality of known audio signatures based a visual feature from the generated visual features; and
    selecting a matching audio signature from the known audio signatures, wherein a comparison score of the matching audio signature exceeds a threshold value, the matching score of the matching audio signature being calculated by comparing the input audio signature with the matching audio signature.

3. The method of claim 1, the method further comprising: causing a presentation of the output on a graphical user interface, the graphical user interface being presented on a display of the user device.

4. The method of claim 1, wherein the audio data is a refinement query or a pivot query, and wherein the determining the one or more search results includes:
processing the plurality of search terms to obtain one or more images;
wherein the one or more search results include the one or more images.

5. The method of claim 4, wherein generating the plurality of search terms comprises generating one or more text embeddings and one or more image embeddings.

6. The method of claim 5, wherein the text embeddings and the image embeddings are combined and inputted into the image search machine-learned models to obtain the one or more images.

7. The method of claim 1, wherein the audio data is an information seeking query, wherein the determining the one or more search results includes:
processing the plurality of search terms, using a web search engine, to obtain web results;
wherein the one or more search results include the web results.

8. The method of claim 7, wherein the visual features include an object name, wherein the plurality of search terms are keywords derived from the plurality of words and the object name.

9. The method of claim 7, wherein the visual features include location data, wherein the plurality of search terms are keywords derived from the plurality of words and the location data.

10. The method of claim 1, wherein the audio data is an action seeking query, wherein the determining the one or more search results includes:
processing the plurality of search terms, using one or more large language models (LLMs), to obtain generative results;
wherein the one or more search results include the generative results.

11. The method of claim 1, the method further comprising:
causing a presentation of the one or more search results on a display of the user device;
in response to the presentation, receiving updated image data captured by the camera of the user device;
detecting, using the one or more machine-learned models, updated visual features in the updated image data;
determining one or more updated search results associated with the plurality of search terms and the updated visual features; and
providing the one or more updated search results as an updated output.

12. The method of claim 1, the method further comprising:
causing a presentation of the one or more search results on a display of the user device;
in response to the presentation, receiving updated audio data captured by the captured of the user device;
processing the updated audio data, using the one or more machine-learned models, to generate updated words;
determining one or more updated search results associated with the plurality of search terms and the updated words; and
providing the one or more updated search results as an updated output.

13. The method of claim 1, wherein the audio data includes context information associated with an object in the image data, and wherein the one or more search results are further determined based on the context information.

14. The method of claim 13, wherein the context information is a user-requested brand name.

15. The method of claim 13, wherein the context information is a user-requested website.

16. The method of claim 1, wherein the audio data includes an attribute associated with an object in the image data, wherein the one or more search results are further determined based on the attribute, and wherein the attribute is a color or a pattern associated with the object.

17. The method of claim 1, wherein the output is an image result, a web result, or a generative result, and the wherein the output is based on a category of the audio data.

18. The method of claim 2, wherein the visual feature is associated with the object in the image data, and the plurality of known audio signatures are noises that are associated with the object.

19. A computing system, the system comprising:
one or more processors; and
one or more non-transitory computer-readable media that collectively store instructions that, when executed by the one or more processors, cause the computing system to perform operations, the operations comprising:
receiving, by a computing system comprising one or more processors, image data captured by a camera of a user device;
receiving audio data associated with the image data, the audio data being captured by a microphone of the user device;
processing the image data to generate visual features;
processing the audio data to generate a plurality of words and an input audio signature, the input audio signature being associated with an object in the image data;
generating, using one or more machine-learned models, a plurality of search terms based on the plurality of words and the visual features, wherein the plurality of search terms is generated by replacing a word in the plurality of words with an updated word, the updated word being derived from the visual features;
determining, based on the input audio signature, one or more search results associated with the plurality of search terms; and
providing the one or more search results as an output.

20. One or more non-transitory computer-readable media that collectively store instructions that, when executed by one or more computing devices, cause the one or more computing devices to perform operations, the operations comprising:
receiving image data captured by a camera of a user device;
receiving audio data associated with the image data, the audio data being captured by a microphone of the user device;
processing the image data to generate visual features;
processing the audio data to generate a plurality of words and an input audio signature, the input audio signature being associated with an object in the image data;

generating, using one or more machine-learned models, a plurality of search terms based on the plurality of words and the visual features, wherein the plurality of search terms is generated by replacing a word in the plurality of words with an updated word, the updated word being derived from the visual features;

determining, based on the input audio signature, one or more search results associated with the plurality of search terms; and providing the one or more search results as an output.

* * * * *